2,996,936
DRILL JIG
Herman T. Blaise, 1008 S. Plymouth Road,
Huntsville, Ala.
Filed Oct. 2, 1958, Ser. No. 765,012
1 Claim. (Cl. 77—62)
(Granted under Title 35, U.S. Code (1952), sec. 266)

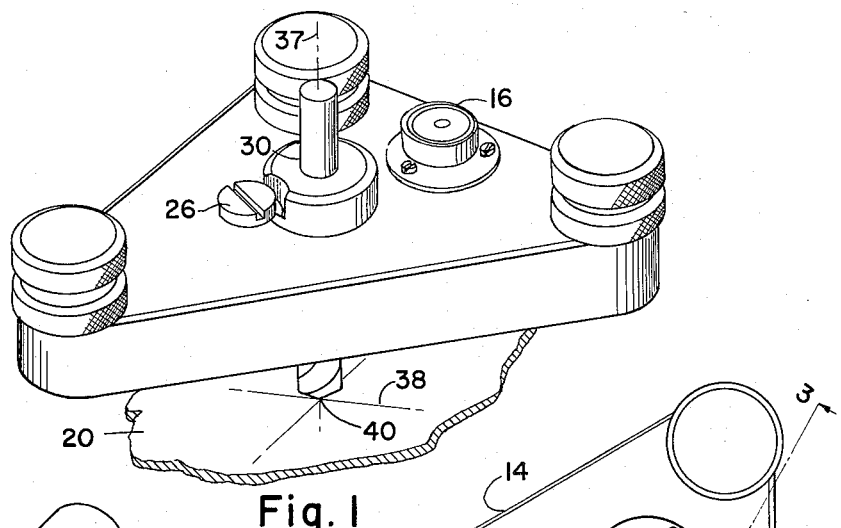
Fig. 1
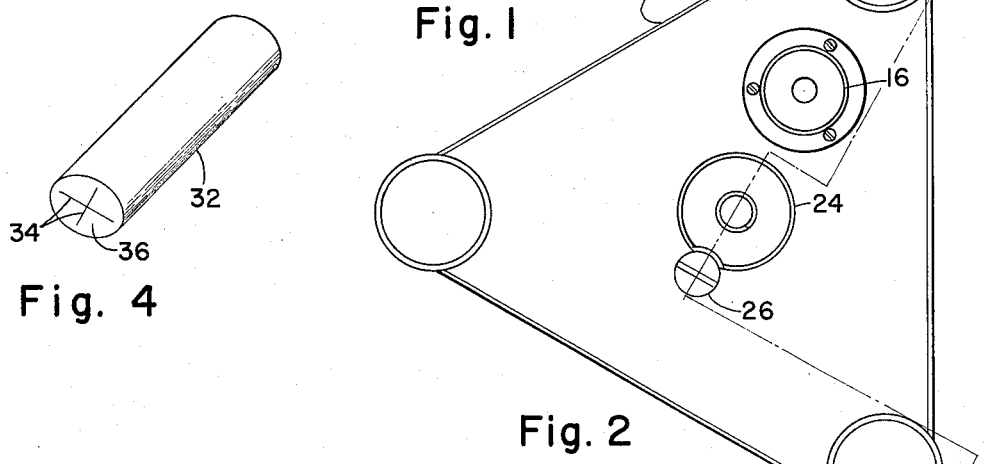
Fig. 4
Fig. 2
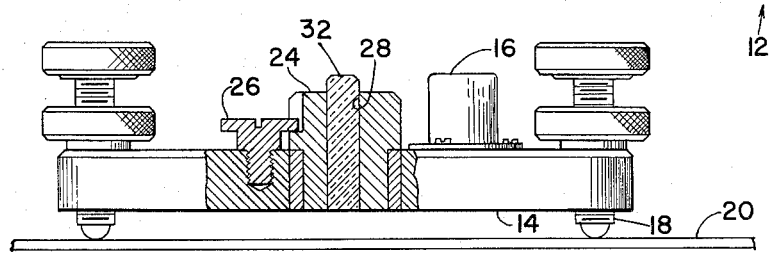
Fig. 3
HERMAN T. BLAISE, INVENTOR.

The invention described herein may be manufactured and used by or for the Government for governmental purposes without the payment of any royalty thereon.

My invention relates to jigs having guides for directing drills into engagement with blanks to be machined and more particularly to such jigs having level platforms and optical devices for accurate alignment with center points on substantially level surfaces of the blanks.

The center points are usually located at the intersection of normally disposed center lines and conventional drill jigs include platforms for engagement with the surfaces and respective tubular guides having cylindrical apertures normal to the platforms for directing drills into engagement with the centerpoints.

The platforms usually include fixed legs for engaging the surfaces and therefore, perpendicularity of the drilled holes to the surfaces depends upon the smoothness thereof. Alignment of the axis of the drills with the center points is only approximated by sighting the center points through the cylindrical apertures.

An object of my invention therefore, is to provide such a jig disposed for accurate alignment of drills with the center points.

Another object of my invention is to provide such a jig disposed to accurately align the axis of a drill in normal relation with the surface of the blank.

Other aims and objects of my invention will appear from the following description.

In carrying out my invention, a jig is provided with a platform having a cylindrical guide disposed in normal relation therewith to project through the platform and direct a drill, a level device, and adjustable legs for engagement with the uneven surfaces of blanks to level the platform.

The jig includes a centering gauge of optical glass disposed for removable engagement with the aperture of the guide and provided with a pair of crosshairs in normal relation intersecting in the axis of the guide. The guide is disposed for rotation for coincidence of the crosshairs with the intersecting center lines for accurate alignment of the axis of the guide with the center points. The gauge may be disposed for magnification of the crosshairs and center lines.

The platform is disposed for clamping of the jig to the blanks to direct drills in engagement therewith.

For more complete understanding, reference is directed to the following description and accompanying drawing, in which, FIG. 1 is a perspective view of a jig incorporating my invention;
FIG. 2 is a plan view of the jig;
FIG. 3 is a view along line 3—3 of FIG. 2; and,
FIG. 4 is a perspective view of the centering gauge.

Accordingly, a jig 12 having a platform 14 is provided with a level mechanism 16 including a spirit bubble secured thereto, to indicate level of the platform. Legs 18 are disposed on platform 14 for engagement with a surface 20 of a blank 22 to be machined. Surface 20 is generally disposed in level attitude and legs 18 are adjustable to compensate for local unevenness in surface 20 to level platform 14, according to mechanism 16.

A guide 24 projects through platform 14 and is secured thereto by a lock 26 in threaded relation with platform 14. The guide is disposed of hardened steel and provided with an aperture 28 in accurate normal relation with platform 14 for directing a rotating drill 30.

Jig 12 is provided with a cylindrical gauge 32 of optical glass disposed for engagement in aperture 28 and provided with crosshairs 34 in normal relation disposed on surface 36 to intersect in the axis 37 of the gauge and of drill 30. Gauge 32 may be rotated in guide 24, and jig 12 may be moved over surface 20 for coincidence of crosshairs 34 with center lines 38 scribed on surface 20 to define a center 40. Gauge 32 is disposed for 10-power magnification of crosshairs 34 and center lines 38. When jig 12 is secured to blank 22 by means of clamps (not shown) engaging platform 14, and gauge 32 is removed from aperture 28, drill 30 is directed to engagement with blank 22 with a high degree of accuracy of coincidence with center 40 and perpendicularity with surface 20.

I claim:

A jig for directing drills into engagement with blanks, said blanks having intersecting centerlines on the surfaces thereof to define center points thereon, said jig comprising a triangular shaped platform, an adjustable leg provided adjacent each corner of said platform, and a spirit level carried on said platform to indicate level attitude thereof responsive to adjustment of said legs, a guide member disposed on said platform and provided with a cylindrical aperture therethrough in normal relation to said platform, locking means threadably secured to said platform and in contact with said guide member for securing the guide member onto said platform, a cylindrical gauge of glass capable of magnification rotatably and removably mounted in said aperture, said gauge being provided with cross-hairs and rotatable for coincidence of said cross-hairs with said center lines of said blanks to effect alignment of a selected one of said center points and the longitudinal axis of said gauge whereby a tool for accurately drilling said blanks at said selected center point can be inserted in said aperture of said guide member subsequent to the alignment and removal of said gauge.

References Cited in the file of this patent
UNITED STATES PATENTS

| | | |
|---|---|---|
| 2,501,036 | Fay | Mar. 21, 1950 |
| 2,733,517 | Gjersoe | Feb. 7, 1956 |
| 2,818,655 | De Gaston | Jan. 7, 1958 |

FOREIGN PATENTS

| | | |
|---|---|---|
| 672,036 | Great Britain | May 14, 1952 |